April 24, 1928.
W. C. STARKEY
LIQUID GAUGE
Filed April 6, 1925
1,667,499
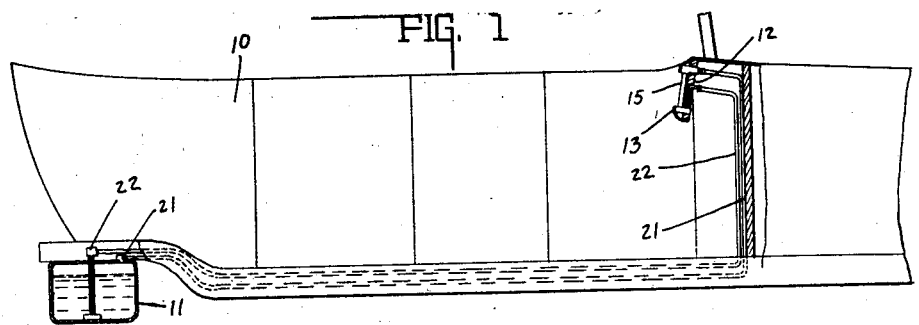
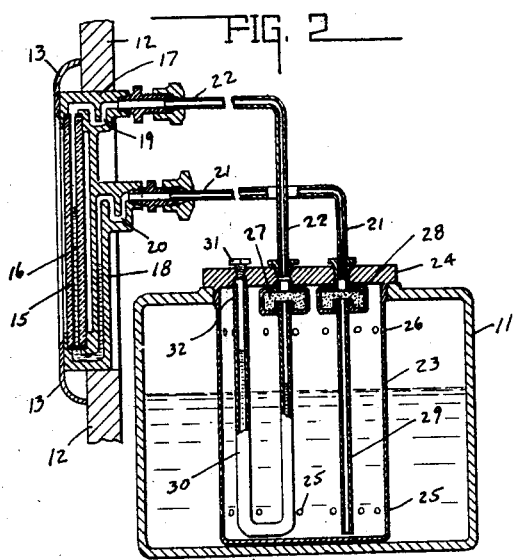
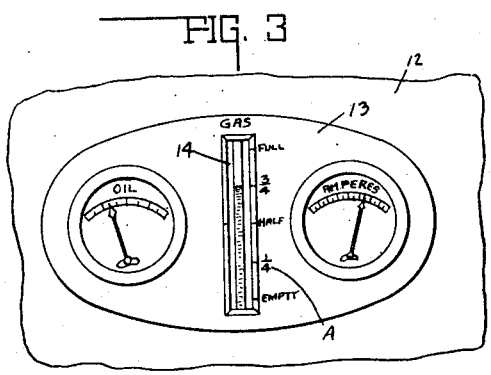
INVENTOR.
WILLIAM C. STARKEY.
BY
ATTORNEYS.

Patented Apr. 24, 1928.

1,667,499

UNITED STATES PATENT OFFICE.

WILLIAM CARLETON STARKEY, OF INDIANAPOLIS, INDIANA.

LIQUID GAUGE.

Application filed April 6, 1925. Serial No. 21,112.

This invention pertains to a remote indicating device for a liquid container, particularly for indicating the amount of gasoline contained in the rear tank of an automobile with the indicator placed conveniently on the dash board.

The object of this invention is to improve over remote indicating devices of this type by providing therein a suitable moisture trap, whereby any moisture finding its way to the control device will not affect the reading.

The full nature of the invention will be understood from the accompanying drawings and the following description and claims:

In the drawings, Figure 1 is a diagrammatic illustration of the indicator mounted on a vehicle and connected with the gasoline tank. Fig. 2 is a central vertical section taken through the connection of the tubes with the gasoline tank and the indicator mounted on the dash board of the vehicle. Fig. 3 is a front elevation of the indicator.

In the drawings there is shown a vehicle body 10 having a gas tank 11 on the rear end thereof, and an instrument board 12. Mounted on the instrument board there is the usual instrument 13 having a vertically extending opening 14 with indicating marks A positioned at the side thereof. Mounted behind said opening so as to be visible therethrough, there is a glass tube 15 open at both ends through which a colored indicating liquid in the passage 16 may pass. Said liquid may preferably be of a red colored glycerine or some suitable compound of that character. There is provided at the top of the tube a fitting 17 and at the lower end thereof a fitting 18 which, when connected with the tube, gives it the effect of a U-tube. Under ordinary conditions, wherein there is atmospheric pressure at both ends of the tube, the liquid will stand at the same depth in both arms of the U-tube, or, as shown herein, in the fitting 18 and the passage 16 of the tube 15. The fittings 17 and 18 are provided with the chambers or traps 19 and 20, respectively, in which the liquid may be caught in event it is forced beyond the length of the U-tube structure, so as to prevent the liquid from being forced through the connecting tubes leading to the gasoline tank.

Leading to the gasoline tank there is a pressure tube 22 and an auxiliary compensating tube 21. The pressure tube 22 is connected at one end with the fitting 17 and the compensating tube is connected at one end with the fitting 18. As shown herein, both tubes extend rearwardly to the gasoline tank adjacent each other so as to be of the same length and exposed to the same variations in temperature at the same place. In practice said tubes may be contained within a single tubular covering, not here shown.

Mounted in the gasoline tank 11 there is a protective casing 23 adapted to screw in the top of the tank and provided with a head 24, said casing extending substantially to the bottom of said tank and being provided near the bottom with the orifices 25 and near the top with the orifices 26 through which gasoline or like liquid may readily pass. The orifices 26 act as vent holes. The tubes 21 and 22 are connected to the head 24 so as to communicate with the trap members 27 and 28, respectively, mounted on the under side of said head. A tube 29 extends upwardly into the trap 28 and downwardly to a point adjacent but slightly spaced from the bottom of the casing 23. A U-tube 30 has one end connected with the trap 27 and extends down to a point adjacent the bottom of the casing, and has its other end connected with the passage through the cap 24 which may be plugged up and closed by a plug 31.

From the foregoing it will be observed that the casing with the head 24 and the tubes 29 and 30, as well as the traps 27 and 28 and plug 31, may be built as a unit and readily inserted in a suitable opening provided in the top of the gasoline tank, after which the tubes 21 and 22 may be readily connected therewith.

The traps 27 and 28 may be filled with some suitable moisture absorbing material, such as calcium chloride, for trapping and absorbing any moisture having a tendency to pass into the tubes 21 and 22. This has the effect of avoiding variations in the reading through said tubes containing moisture having a different coefficient of expansion from air. The U-tube 30 is partially filled with a suitable liquid through the plug 31 which will compensate for the cushion effect produced by the gasoline extending upwardly in the tube 29. The quantity of liquid poured into the U-tube 30 will also adjust the position of the indicating liquid contained in the U-tube formed by the tube 15 and fitting 18.

After the instrument has been installed and the connections made, with the tank empty, non-volatile, non-freezing fluid is poured into the U-tube 30 until it compresses the air in the tube 21 sufficiently to cause the indicating liquid contained in the tube 15 to read zero or "empty". Thereupon, when the tank is filled with gasoline, the gasoline will pass through the ports 25 and rise in the tube 29, compressing the air in the tube 21 sufficient to overcome the air pressure in the tube 22 and force the liquid contained in the fitting 18 downwardly, thereby forcing the indicating liquid in the tube 15 upwardly to the proper reading. As the level of the gasoline in the tank rises, the level in the tube 29 will rise and the liquid in the fitting 18 will be forced downwardly so as to cause the indicating liquid in the tube 15 to rise against the pressure contained in the tube 22.

In event the tubes 21 and 22 become warm, their air capacity being equal, the air contained therein will be expanded to an equal degree so that the pressure exerted by such increase in temperature will effect in a like manner both ends of the liquid column in the tube 15 and fitting 18 so as to offset each other and, therefore, have no effect upon the level or reading indicated thereby. The same situation will follow when the tubes become cold and the air contracts. In order to offset the cushion effect of the gasoline contained in the tube 29, upon the expansion or contraction of the air in the tube 21, a cushion is provided for the tube 22 by the liquid contained in the U-tube 30. Furthermore any variation in the pressure or partial vacuum in the tank 11 will be compensated for, since such pressure being exerted upon the tube 21 through the lower end of the tube 29 will be exerted in a similar manner upon the tube 22 through a vent 32 in the U-tube 30. It will, therefore, be apparent that such compensation is provided throughout the device as to prevent inaccuracy or misreadings due to either variation in temperature, variation of pressure in the gasoline tank or the amount of gasoline extending upwardly in the tube 29.

The invention claimed is:

1. The combination with a liquid tank, of a remote liquid indicator comprising a U-tube remotely positioned from said tank and containing an indicating fluid therein, a pressure tube connected with one end of said U-tube and extending into said tank, and means associated with said pressure tube for preventing moisture from accumulating therein.

2. The combination with a liquid tank, of a remote liquid indicator comprising a U-tube remotely positioned from said tank and containing an indicating fluid therein, a pressure tube connected with one end of said U-tube and extending into said tank, a trap associated with said pressure tube, and moisture absorbing material positioned in said trap for catching and absorbing moisture passing therethrough and preventing its entrance into said tube.

3. The combination with a liquid tank, of a remote liquid indicator comprising a U-tube remotely positioned from said tank and containing an indicating fluid therein, a pressure tube connected with one end of said U-tube and extending into said tank, a compensating tube connected to the other end of said U-tube and extending substantially parallel and adjacent to said pressure tube, a U-tube extending into said tank and communicating with said auxiliary tube and being provided with a closure at one end and a vent hole, a cushioning liquid contained in said last-mentioned U-tube and a moisture trap associated with said pressure and auxiliary tubes for preventing moisture from entering therein.

In witness whereof, I have hereunto affixed my signature.

WILLIAM CARLETON STARKEY.